Jan. 10, 1961 J. P. SILYE 2,967,534
TENT SHELTER
Filed Nov. 7, 1957 4 Sheets-Sheet 1
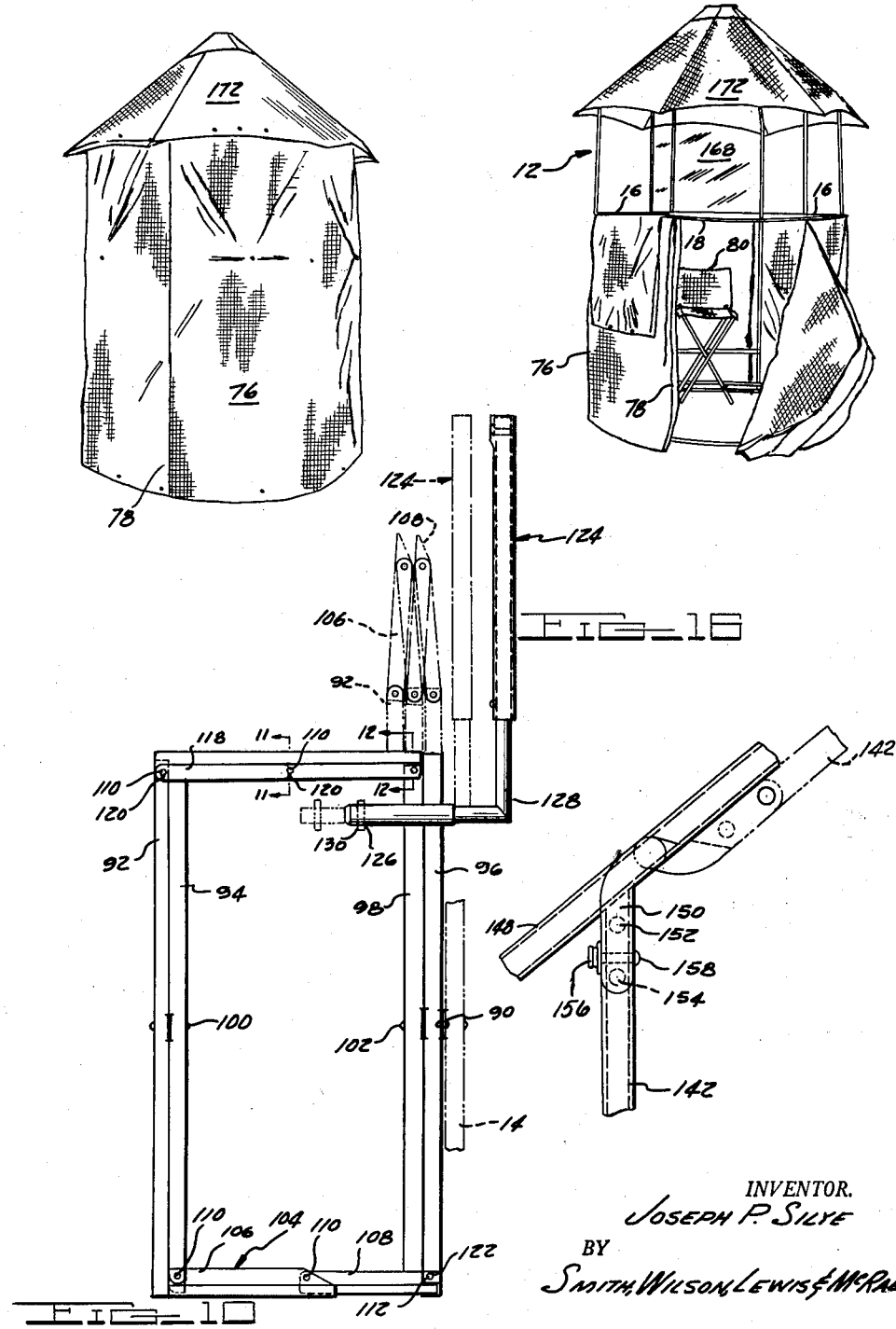
INVENTOR.
JOSEPH P. SILYE
BY
Smith, Wilson, Lewis & McRae Jan. 10, 1961
J. P. SILYE
2,967,534
TENT SHELTER
Filed Nov. 7, 1957
4 Sheets-Sheet 2
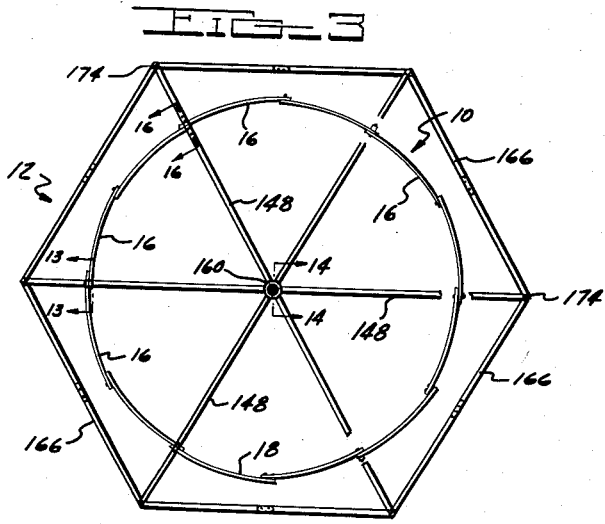
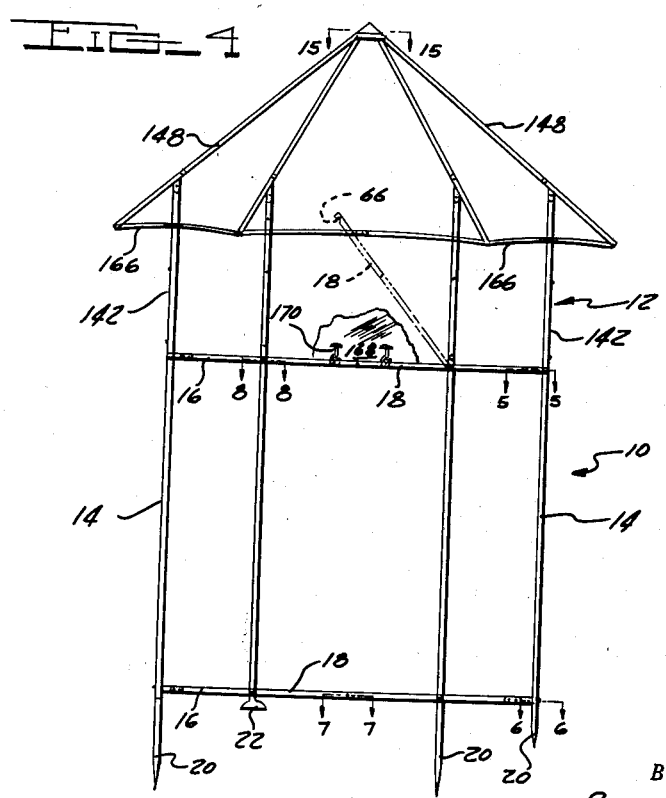
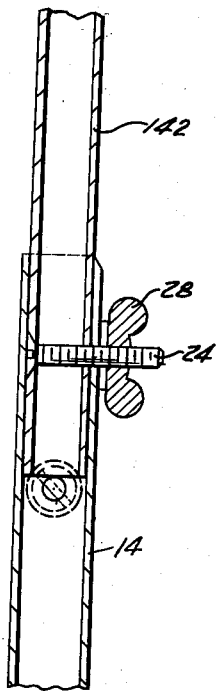
INVENTOR.
JOSEPH P. SILYE
BY
SMITH, WILSON, LEWIS & McRAE Jan. 10, 1961 J. P. SILYE 2,967,534
TENT SHELTER
Filed Nov. 7, 1957 4 Sheets-Sheet 3
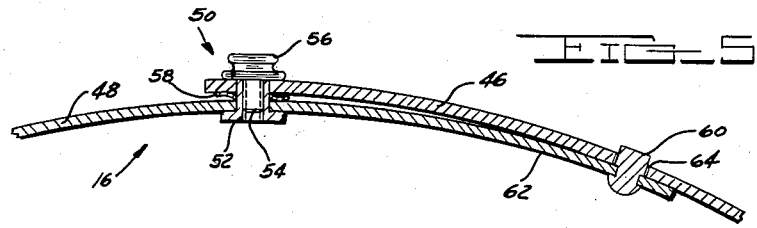
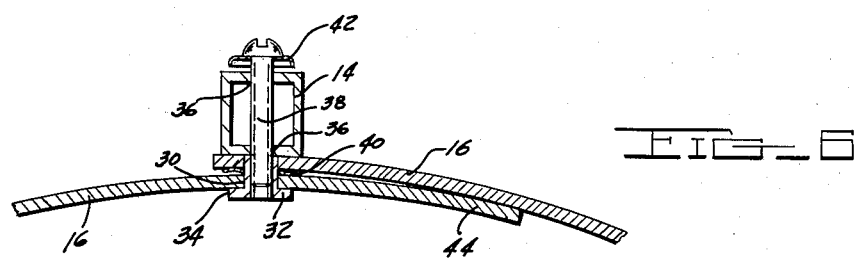
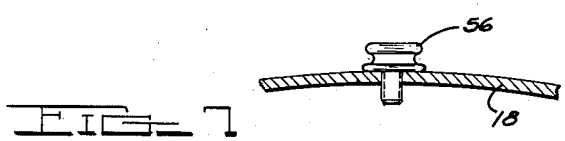
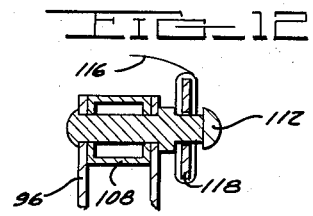
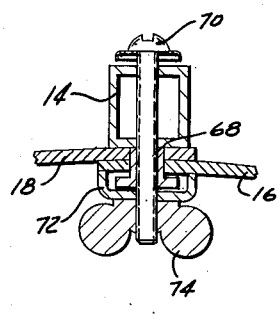
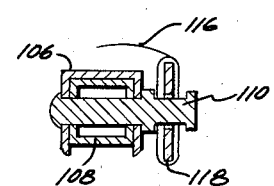
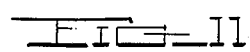
INVENTOR.
JOSEPH P. SILYE
BY
SMITH, WILSON, LEWIS & McRAE Jan. 10, 1961 J. P. SILYE 2,967,534
TENT SHELTER
Filed Nov. 7, 1957 4 Sheets-Sheet 4
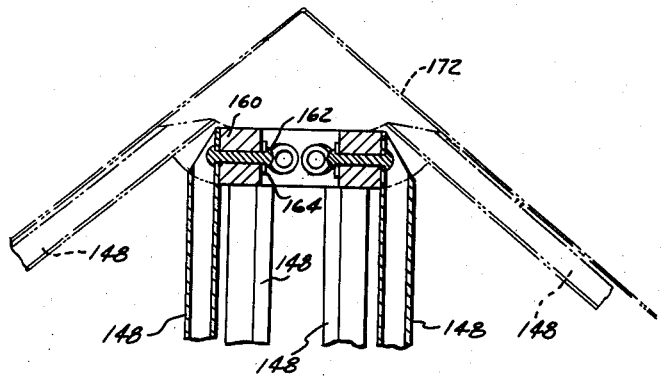
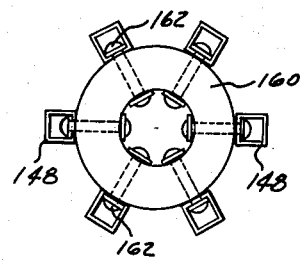
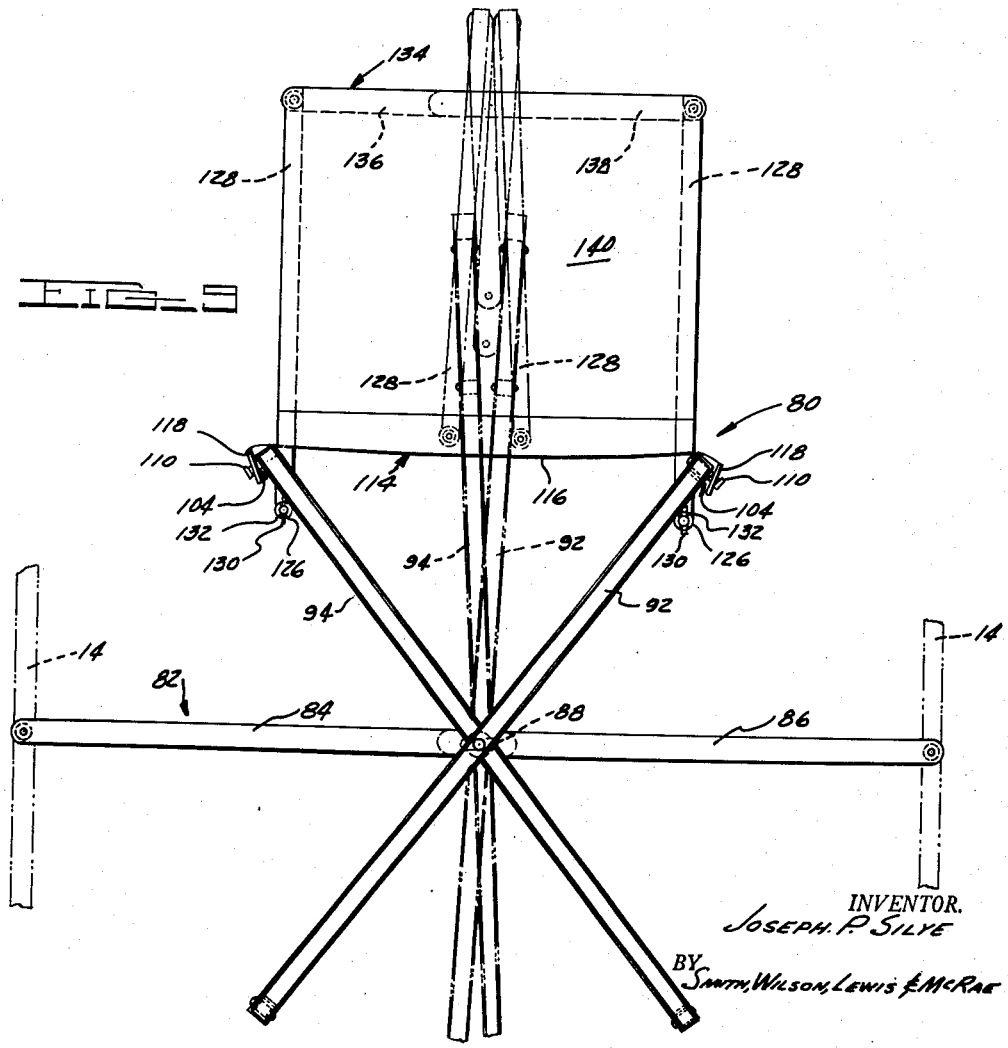
INVENTOR.
JOSEPH P. SILYE
BY Smith, Wilson, Lewis & McRae

# United States Patent Office 2,967,534
Patented Jan. 10, 1961

2,967,534
TENT SHELTER
Joseph P. Silye, 1518 Grant, Lincoln Park 25, Mich.

Filed Nov. 7, 1957, Ser. No. 695,152

5 Claims. (Cl. 135—4)

This invention relates to a tent shelter, and particularly to a sturdy, collapsible lightweight tent having rigid supporting members but which may be folded into two small compact bundles for portability.

The tent structure of the present invention is particularly useful as a fishing shanty or a hunting blind. However, it may also be used as a beach shelter for changing clothes, an equipment shelter, a ticket or other dispensing booth at picnics and fairs, etc.

The shelter is sturdy when erected and able to withstand high winds and the pressure of objects and people leaning or bumping into it. Its cylindrical cross-section permits maximum head room and also presents a pleasing appearance. Water is easily shed from the tent by virtue of a cone-shaped top. The simplified structure of the rigid but collapsible supporting members provides an interlocking framework which may be easily and rapidly erected.

In one embodiment the tent may be provided with a detachable peripheral flap near the top which may be lowered when the tent is used as a hunting blind thereby providing the hunter with a visibility and firing opening.

In another embodiment a foldable chair is provided for the convenience and comfort of the occupant. The chair is made integral with the tent and is foldable therewith into one of the compact storage bundles.

It is an important object of the present invention to provide a collapsible tent of a two-piece construction which is adapted for ready erection without the use of the usual tent poles, ropes and stakes.

Another object of my invention is the provision of a collapsible tent which is sturdy, simple in construction, and which may be manufactured at a relatively low cost.

A further object is the provision of a tent having a detachable top that may be collapsed into a small compact bundle which may be easily reopened and fastened to the lower tent portion so as to aid in supporting the lower framework and which is of such a configuration that water will be easily shed therefrom.

Another object of my invention is the provision of foldable horizontal frame members which when erected will give the tent a rounded rather than an angular appearance.

A still further object of my invention is the provision of a variety of ground engaging elements which will make the tent adaptable to be anchored to ice or to hard or soft ground with a minimum of effort.

Another object of my invention is the provision of a cone-shaped roof which will shed water in the fashion of an umbrella and which will offer a minimum of resistance to strong winds thereby tending to make the tent secure during severe storms.

A yet further object of my invention is the provision of a two way zipper to secure the entrance flap thereby permitting the flap to be secured from the inside or the outside, whichever is the more convenient method for the user.

A still further object of my invention is the provision of a tent which may be converted into a hunting blind by lowering a detachable flap which extends around the periphery of the tent.

Another object of the present invention is the provision of a transparent flap which may be detachably fastened over a portion of the area exposed when the tent is used as a hunting blind so as to protect the hunter from being exposed to air drafts.

A further object of my invention is the provision of a collapsible chair which may be mounted on the interior of the tent and collapsed and erected therewith.

It is a further object of my invention to provide a tent frame having foldable horizontal struts connecting rigid upright post members whereby the tent may be easily erected or collapsed.

Other objects of this invention will appear in the following description and appended claims, reference being had to the accompanying drawings forming a part of this specification wherein like reference characters designate corresponding parts in the several views.

In the drawings:

Fig. 1 is a front elevational view of an embodiment of the present invention showing the tent erected and closed.

Fig. 2 is a front elevational view of an embodiment of the present invention showing the tent structure with the entrance and vision flaps open.

Fig. 3 is a top plan view of the framework of the tent of Figs. 1 and 2.

Fig. 4 is an elevational view of the framework used in the tent structure in Figs. 1 and 2.

Fig. 5 is a perspective view taken substantially along the lines 5—5 of Fig. 4 looking in the direction of the arrows.

Fig. 6 is a sectional view taken substantially along the lines 6—6 of Fig. 4 in the direction of the arrows.

Fig. 7 is a sectional view taken substantially along the lines 7—7 of Fig. 4 in the direction of the arrows.

Fig. 8 is a sectional view taken substantially along the lines 8—8 of Fig. 4 in the direction of the arrows.

Fig. 9 is an enlarged front elevational view of the collapsible chair shown in Fig. 2.

Fig. 10 is an enlarged side elevational view of the collapsible chair shown in Fig. 2.

Fig. 11 is a sectional view taken substantially along the lines 11—11 of Fig. 10 in the direction of the arrows.

Fig. 12 is a sectional view taken substantially along the lines 12—12 of Fig. 10 in the direction of the arrows.

Fig. 13 is a sectional view taken substantially along the lines 13—13 of Fig. 3 in the direction of the arrows.

Fig. 14 is an enlarged fragmentary view taken along the lines 14—14 of Fig. 3 in the direction of the arrows.

Fig. 15 is a sectional view taken substantially along the lines 15—15 of Fig. 4 in the direction of the arrows.

Fig. 16 is a sectional view taken substantially along the lines 16—16 of Fig. 3 looking in the direction of the arrows.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The tent as illustrated in Figs. 1 and 2 embodies the framework shown in Figs. 3 and 4. The framework comprises a lower frame 10 which is detachably fastened to an upper frame 12. The lower frame 10 comprises a plurality of upright post elements 14 which are interconnected by means of a plurality of foldable struts 16 and a pair of rigid struts 18.

There may be, as shown, six post elements 14. However, more or fewer may be provided depending on the desired size of the tent. The post elements 14 are preferably thin walled sections of square metal tubing. The metal is preferably a lightweight metal such as aluminum or magnesium. The lower ends of the posts 14 may be provided with tapered projections 20. The projections 20 may be formed as an integral part of the post 14 or they may be detachably mounted as shown in Fig. 4. The tapered projections 20 serve as ground stakes for the purpose of securing the frame 10 to a supporting surface. The length of the stakes 20 may vary according to the nature of the surface upon which the tent is to be anchored. For example, if the tent is to be erected on soft ground, such as may be the case when used as a hunter's blind, the stakes 20 should be relatively long in order to provide sufficient support. However, when the tent is to be anchored in a hard surface, such as ice, shorter stakes 20 would be adequate. Detachable suction cups 22 may be provided in preference to the ground stakes 20. The suction cups 22 provide a convenient and strong anchor when the tent is erected on ice. The detachable stakes 20 and suction cups 22 may be fastened to the lower end of the posts 14 by means of a machine screw 24 and wing nut 28 as illustrated in Fig. 13.

As previously mentioned, a plurality of struts 16, 18 interconnect the upper and lower portions of the post elements 14. The foldable struts 16 are hinged at their mid-portions, and pivotally fastened at each end to a post 14. The lower struts 16 are foldable upwardly against the post elements 14 and the upper struts 16 are foldable downwardly against the posts 14 to provide a compact collapsed condition of the frame 10.

The pivotal fastening of a strut 16 to a post 14 is illustrated in Fig. 6. The struts 16 are provided with openings 30 adjacent the ends. A bushing 32 projects through the openings 30. The inner end of the bushing 32 is provided with an annular flange 34 which abuts against the inner side of the strut 16. The bushing 32 is preferably of hardened metal in order to lengthen its life and to provide ease of operation when assembling or disassembling the tent. The posts 14 are also provided with openings 36 adjacent the ends. A machine screw 38 is inserted through the openings 30, 36 and is threadingly fastened to the bushing 32. A spring washer 40 is provided between the two struts 16 in order to maintain a constant pressure at all times between the various members fastened at this pivot point. A cup washer 42 may be inserted between the head of the machine screw 38 and the post 14. A projection 44 is provided on the innermost of the struts 16 for the purpose of distributing the stress on the struts 16 and also to provide a continuous curve of the struts.

As best seen in Fig. 5, the struts 16 are constructed of two links 46, 48 of approximately equal length. The links 46, 48 are pivotally fastened together at the hinge point 50. They may be folded in a direction parallel to the posts 14 to form a compact storage bundle. The links 46, 48 are pivotally fastened at point 50 by means of a bushing 52, a machine screw 54 which may have a male dot fastener 56 mounted in place of a slotted head 58 and a spring washer 58 arranged substantially in the same manner as described for the strut 16 to post 14 pivotal fastening. The male dot fastener 56 may be used to detachably fasten a flexible outer cover to the frame 10.

A pilot pin 60 is provided on an extension 62 of link 48 for the purpose of locking the links 46, 48 together to form a rigid strut 16. The pilot pin 60, which is preferably of a hardened metal, is fixedly fastened at right angles to the inner link 48. An opening 64 is provided in the link 46 in registry with the pin 60. The pin 60 may engage the opening 64 and lock the links 46, 48 together to form a continuous rigid strut 16.

A pair of one-section struts 18 are pivotally fastened to a post 14 adjacent the upper and lower ends. The pivotal fastening means is substantially the same as previously described for the struts 16. As shown in Fig. 4 the opposite end of the strut 18 is adapted to be detachably fastened to a post 14. A slot 66 is provided adjacent the end of the strut 18. As best seen in Fig. 8, the slot 66 engages a bushing 68. The bushing 68 is secured by means of a machine screw 70 which extends through the post 14 and a strut 16. The strut 18 is secured in position by means of a clip 72 and wing nut 74 which threadingly engages the projecting portion of the screw 70. The clip 72 may be a conventional C-clip. As shown in Fig. 7, a male dot fastener 56 is provided at the midportion of the strut 18. The struts 18 are provided to form a door or passageway into and out of the tent and to permit the lower frame 10 to be opened for the purpose of assembly and disassembly.

As shown in Figs. 1 and 2, the frame 10 is provided with a flexible outer covering 76. Any suitable material, such as a plastic or cloth, may be used to form the covering 76. The covering 76 is fixedly fastened to the frame 10 at the post elements 14 by means of the machine screws 38. Reinforced openings are provided in the covering 76 for this purpose. The covering 76 may be detachably fastened to the struts 16, 18 by means of the male dot fasteners 56 which engage corresponding female dot fasteners mounted in the covering 76.

The covering 76 is also provided with a full length two-way zipper 78 to facilitate closing or opening from the inside or outside of the tent. As shown in Fig. 1, the zipper 78 is preferably located adjacent a post element 14 to which the struts 18 are detachably fastened.

The covering 76 may be provided in two lengths. When the tent is to be used only as a hunting blind, the portion extending beyond the upper struts 16, 18 may be omitted. However, when it is desired to provide a tent which may be used either as a completely closed structure or as a hunting blind, the covering 76 may be lengthened to cover part of the upper frame 12. The extension of the covering 76 may be detachably fastened to the upper frame 12 as will be later described.

A collapsible chair 80 may be provided in the frame 10. While only one chair is shown, it is obvious that more chairs could be provided. As shown in Fig. 9, the chair 80 is pivotally fastened to a foldable supplemental strut 82. Each end of the strut 82 is pivotally fastened to a post 14 below the mid-portion of the post 14. The fastening means is substantially the same as hereinbefore described for the struts 16. The strut 82 comprises two links 84, 86 which are pivotally and slidably fastened together. A longitudinal slot 88 is provided adjacent one end of the link 84. A pin 90 projects at right angles from the end of the other link 86. The pin 90 projects through the slot 88 and is enlarged at its distal end to maintain the two links 84, 86 in engagement. This structure permits the mid-portion of the strut 82, which carries the chair 80, to be moved a few inches up or down. The distance is determined by the length of the slot 88. This movement permits the chair 80 to be adjusted vertically in relation to irregularities of the surface upon which the tent is erected.

As illustrated in Figs. 9 and 10, the chair 80 is provided with a pair of front legs 92, 94 pivotally fastened to one another at their mid-points and a pair of rear legs 96, 98 pivotally fastened to one another at their mid-points. The legs 92, 94 and 96, 98 may be pivotally fastened by means of rivets 100, 102. The diametrically opposed legs 92, 94 and 96, 98 are connected at their upper and lower ends by means of foldable cross-members 104. The cross-members 104 each comprise two links 106, 108. One link 106 which has a channel cross-section is pivotally fastened at one end to a chair leg by means of a rivet 110 and at the opposite end to the link 108 also by means of a rivet 110, as illustrated in Fig. 11. The link 108 is pivotally fastend at its other end to a chair leg by means of a rivet 112 as shown in Fig. 12. The link 108 may be a square tubular section. The links 106, 108 may be folded into a side-by-side position as shown in phantom in Fig. 10.

A flexible seat member 114 extends between the upper cross-members 104. The central portion 116 of the seat member 114 may be any suitable material such as plastic or a cloth fabric. A retaining plate 118 is fastened to each of two diametrically opposed edges of the central portion 116. The plate 118 has two slots 120 and, at one end, a circular opening 122. The plates 118 are fastened to the chair 80 by means of the outwardly extending portions of the rivets 110, 112 which engage the plates 118 by means of the slots 120 and opening 122. The rivets 110 may be disengaged from the slots 120 by moving the plates upwardly and outwarly. The seat member 114 will then be free to pivot about an axis defined by the rivets 112.

A chair back 124 is also provided. The chair back 124 serves to provide a back rest and to lock the chair 80 in the erected position. The chair back 124 is slidably fastened to the rear legs 96, 98 by means of a pair of tubular members 126. The members 126 are mounted, preferably by welding, on the legs 96, 98 adjacent their upper ends and at substantially right angles thereto. The chair back 124 is provided with two L-shaped uprights 128. The lower portions of the uprights 128 are inserted into the hollow tubular members 126. Pins 130 extend at right angles from the ends of the inserted portions of the uprights 128. When the chair back 124 is moved in a direction away from the legs 96, 98, the pins 130 will engage slots 132 which are provided in the members 126. The chair back is consequently prevented from rotating and the legs 96, 98 are prevented from closing.

The uprights 128 are connected at their upper ends by means of a cross-member 134. The cross-member 134 comprises two links 136, 138. The links 136, 138 are pivotally fastened to an upright 128 at one end and are pivotally fastened together at the opposite ends. Locking means are also provided on the links 136, 138 to form a rigid cross-member. The locking means and pivotal fastening are substantially the same as that described for the foldable struts 16. A flexible panel 140 is provided between the uprights 128 to serve as a chair back support. As illustrated in phantom in Figs. 9 and 10, the chair 80 may be collapsed by disengaging the locking pin on cross-member 134, moving the chair back 124 inwardly, and disengaging the plates 118.

The upper frame 12, which completes the tent structure, comprises a cone or umbrella shaped roof section having a plurality of vertical supporting post members 142 projecting downwardly therefrom. The post members 142 are spaced about the periphery of the frame 12 so as to be in registry with the post members 14 of the lower frame 10. The upper frame 12 may be detachably fastened to the lower frame 10 by inserting the posts 142 into the hollow interior of the posts 14 and securing the posts 14, 142 in this position by means of a machine screw 24 and wing nut 28 as illustrated in Fig. 13.

The post elements 142 are pivotally fastened at their upper ends to a plurality of upwardly convergent roof rib or bow elements 148 at a point near the lower ends of the roof bows 148. The method of attachment is illustrated in Fig. 16. The end of the short segment of a generally L-shaped link 150 is pivotally fastened to a roof bow 148. The end of the long segment of the L is fixedly fastened to a post 142 by means of two rivets 152, 154. Male dot fasteners 156 may be attached to the upper ends of the post elements 142 by means of rivets 158 as shown in Fig. 16. These dot fasteners 156 provide means to detachably secure the upper end of the lower frame covering 76.

As best seen in Figs. 14 and 15, the upper ends of the roof bows 148 are secured to a resilient ring 160. The ring 160 may be fabricated from any suitable material such as a medium hard rubber. The roof bows 148 are fastened to the ring 160 by means of the rivets 162. The rivets 162 are upset at both ends. A washer 164 may be inserted between the interior periphery of the ring 160 and the head of the rivet 162. The rivets 162 are preferably hollow point rivets to permit flexibility in folding and unfolding of the roof bows 148.

The lower ends of the roof bows 148 are supported and separated by the foldable struts 166. The construction of the struts 166 and method of attachment to the roof bows 148 are substantially the same as that previously described for the foldable struts 16 of the lower frame 10.

A transparent wind protection panel 168 may be provided for use when the tent is to be used as a hunting blind. The panel 168 is secured to the exterior of the tent across an open area created by lowering the upper portion of the covering 76. The panel 168 extends for only a portion of the entire periphery of the tent. It is preferably placed at the rear of the tent occupant or in a position which will block the wind. The upper edge of the panel 168 is provided with female dot fasteners which may be fastened to the male dot fasteners 176 on the post elements 142 adjacent the juncture of the roof bows 148 and posts 142. Hooks 170 may be provided depending from the lower edge of the panel 168 for attachment to a strut 16 of the lower frame 10.

A flexible outer covering 172 is secured on the roof bow elements 148. The covering 172 comprises a plurality of panels each tailored to fit between two roof bow elements 148 and a strut 166. The covering 172 is attached to the roof bow elements by means of the machine screws 174 which are also used to hold the struts 166 in place and is detachably fastened to the struts 166 by means of the male dot fasteners 176.

All of the structural members of the frames 10, 12 are preferably fabricated of a light metal, such as magnesium or aluminum. This provides a frame which is both light and sturdy. The roof bows 148 and the posts 14 and 142 are preferably square tubular sections.

The tent is seen to be useful for many diverse purposes. It may be converted from a partially open hunting blind to a completely closed structure that will provide excellent protection against the elements. It is easily erected and is readily disassembled and folded into two light, compact bundles. The preferable manner of erection is to first assemble the lower portion. Holes for the ground stakes may be driven adjacent to the ends of the stakes and the tent moved so that the stakes will be in registry with the holes and be easily inserted therein. If the detachable suction cups are going to be used on ice, they are preferably first warmed, as by pressing against the palm of a hand, so that a thin film of adhering ice will form when they are applied to the surface thus securing the cups firmly to the ice surface. The upper portion of the tent may be easily installed from within the lower portion.

Having thus described my invention, I claim:

1. A tent comprising an upper frame and a lower frame detachably connected together; said lower frame comprising a plurality of upright posts and struts connected therebetween adjacent their upper and lower ends; one pair of the struts having detachable connections with post sections adjacent thereto, and the remaining struts comprising foldable sections pivotally connected to the posts, whereby the lower frame may be collapsed into a compact carrying bundle; said upper frame comprising a plurality of upright posts detachably connected with the first mentioned posts, a plurality of upwardly convergent roof rib elements having a hinge connection between their upper ends and pivotally connected with the upper posts at locations spaced upwardly from the rib element lower ends; and foldable struts connecting the rib element lower ends whereby the upper frame may be collapsed into a compact carrying bundle; the combination further comprising a flexible panel carried by the rib elements and slanting downwardly to the foldable struts so as to overlap the upper ends of the upper posts and thereby provide for run-off of rain water away from the tent interior.

2. The combination of claim 1 wherein said hinge connection comprises a resilient annulus rigidly secured to the upper ends of the rib elements, whereby to form a simplified hinge connection between the rib elements during collapsing and uncollapsing operations.

3. The combination of claim 1 wherein the tent is particularly adapted for employment on ice, the combination including suction cups carried on the lower ends of the lower posts for gripping the ice surface to lock the tent in position.

4. A tent comprising an upper frame and a lower frame detachably connected together; said lower frame comprising a plurality of upright posts and struts connected therebetween adjacent their upper and lower ends; one pair of the struts having detachable connections with post sections adjacent thereto, and the remaining struts comprising foldable sections pivotally connected to the posts, whereby the lower frame may be collapsed into a compact carrying bundle; said upper frame comprising a plurality of upright posts detachably connected with the first mentioned posts, a plurality of upwardly convergent roof rib elements having a hinge connection between their upper ends and pivotally connected with the upper posts, and foldable struts connecting the lower portions of said roof rib elements whereby the upper frame may be collapsed into a compact carrying bundle; the combination further comprising a first flexible panel carried by the lower frame to surround the tent occupants, and a second flexible panel carried by the rib elements to overlie the tent occupants; the detachable relationship between the frames and the panel formation being such that the tent may be erected by merely unfolding and connecting the frames without applying separate panels thereto.

5. The combination of claim 4 wherein the first panel includes an extension adapted to be pulled upwardly alongside the upper posts and terminate adjacent the second panel so as to form a complete tent shelter.

References Cited in the file of this patent

UNITED STATES PATENTS

| | | |
|---|---|---|
| 1,759,117 | Hopp | May 20, 1930 |
| 1,799,029 | Smith | Mar. 31, 1931 |
| 2,168,913 | Middleton | Aug. 8, 1939 |
| 2,299,382 | Creasy | Oct. 20, 1942 |
| 2,540,411 | Wright | Feb. 6, 1951 |
| 2,582,864 | Gittings et al. | Jan. 15, 1952 |
| 2,594,065 | O'Neill | Apr. 22, 1952 |
| 2,623,532 | McGanty | Dec. 30, 1952 |
| 2,652,845 | O'Neill et al. | Sept. 22, 1953 |
| 2,781,766 | Kreiger | Feb. 19, 1957 |
| 2,818,078 | White | Dec. 31, 1957 |

FOREIGN PATENTS

| | | |
|---|---|---|
| 15,851 | Great Britain | Dec. 4, 1886 |
| 207,714 | Germany | Mar. 9, 1909 |
| 345,623 | Italy | Jan. 12, 1937 |
| 823,693 | France | Oct. 18, 1937 |